US008335588B2

(12) United States Patent
Rahilly et al.

(10) Patent No.: US 8,335,588 B2
(45) Date of Patent: Dec. 18, 2012

(54) MULTI-LIDDED DISPENSING CARTRIDGE SYSTEM

(75) Inventors: Michael Rahilly, Encinitas, CA (US); Frank Dean Weber, San Diego, CA (US)

(73) Assignee: CareFusion 303, Inc., San Diego, CA (US)

( * ) Notice: Subject to any disclaimer, the term of this patent is extended or adjusted under 35 U.S.C. 154(b) by 314 days.

(21) Appl. No.: 12/828,124

(22) Filed: Jun. 30, 2010

(65) Prior Publication Data

US 2012/0004772 A1 Jan. 5, 2012

(51) Int. Cl.
*G06F 17/00* (2006.01)

(52) U.S. Cl. ......... 700/242; 700/241; 221/156; 312/222

(58) Field of Classification Search .................. 700/242, 700/241; 221/156; 312/222, 209
See application file for complete search history.

(56) References Cited

U.S. PATENT DOCUMENTS

| | | | | |
|---|---|---|---|---|
| 4,033,477 | A | 7/1977 | Hoppe et al. | |
| 4,668,150 | A | 5/1987 | Blumberg | |
| 5,588,317 | A | 12/1996 | Bianco | |
| 5,927,540 | A * | 7/1999 | Godlewski | 312/209 |
| 5,940,306 | A | 8/1999 | Gardner et al. | |
| 6,011,999 | A * | 1/2000 | Holmes | 700/242 |
| 6,631,805 | B2 | 10/2003 | Bramen | |
| 6,666,055 | B2 | 12/2003 | Janicek | |
| 7,142,944 | B2 * | 11/2006 | Holmes et al. | 700/242 |
| 7,426,425 | B2 * | 9/2008 | Meek et al. | 700/241 |
| 7,630,791 | B2 * | 12/2009 | Nguyen et al. | 700/242 |
| 8,103,379 | B2 * | 1/2012 | Biba et al. | 700/242 |
| 8,197,017 | B2 * | 6/2012 | Rahilly | 312/222 |
| 8,234,008 | B2 * | 7/2012 | Weber | 700/242 |
| 2009/0114562 | A1 | 5/2009 | Noble et al. | |

FOREIGN PATENT DOCUMENTS

| | | |
|---|---|---|
| EP | 0771739 | 5/1997 |
| JP | 10-201825 | 8/1998 |
| WO | WO 2009-022101 | 2/2009 |

* cited by examiner

*Primary Examiner* — Timothy Waggoner
(74) *Attorney, Agent, or Firm* — McDermott Will & Emery LLP

(57) ABSTRACT

A cartridge for use in a dispensing system is disclosed. The cartridge includes a body having an exterior and a plurality of bins. A plurality of lids are movably attached to the body and are configured to cover a bin. A release mechanism is movable along an axis. A plurality of latches are movably attached to the body. Each latch is configured to secure the respective lid when in a first position and to release the respective lid when in a second position. The release mechanism will not cause a latch to move to the second position when the release mechanism is moving along the axis in a first direction. The release mechanism will cause a single latch to move to the second position while leaving the remaining latches in the first position when the release mechanism is moving along the axis in a second direction.

30 Claims, 17 Drawing Sheets

MULTI-LIDDED DISPENSING CARTRIDGE SYSTEM

BACKGROUND

1. Field

The present disclosure generally relates to systems and methods for dispensing items and, in particular, systems having individually actuated lidded compartments suitable for single-item dispensing of items.

2. Description of the Related Art

Automated dispensing of medications using Automated Dispensing Machines (ADMs) has become common in hospitals around the world. The benefits include a reduction in the amount of pharmacist labor required to dispense the medications as well as enabling nurses to obtain the medications faster as many ADMs are located at the nursing stations. ADMs also provide secure storage of medications, particularly controlled substances, as users must typically identify themselves and the patient to whom the medication will be administered before the ADM will dispense the medication.

One of the challenges of ADMs is the method of restocking. ADMs that have fixed drawers require the pharmacist to transport medications to the ADM and load the medications, which both consumes pharmacist time and makes the ADM unavailable to the nurses during the loading process. Another challenge is providing the ability to dispense a single dose of medication, particularly controlled substances, without providing access to a larger stock of the same medications. Existing single-dose dispensing products can be complex, unreliable, or inefficient in space usage.

The technology of ADMs is applicable to a wide range of non-medical applications, such as dispensing of consumable cutting tools in a machine shop or tracking of tools while working on an aircraft engine where it is critical to ensure that no tool has been left in the engine. Applications where inventory control is a concern or where the identity of the user must be authenticated prior to allowing access to the contents of the storage system are candidates for the use of ADM technology.

SUMMARY

The multi-lidded cartridge and the dispensing system disclosed herein provide an elegant and secure method of dispensing items such as medications. The cartridge may be loaded at a remote location such as a pharmacy and securely transported to the ADM by a non-pharmacist and quickly loaded into the ADM, saving pharmacist time and improving the availability of the ADM to nurses. The cartridges provide single-dose dispense capability in a space-efficient manner.

A cartridge is disclosed. The cartridge comprises a body having an exterior and a plurality of bins, each bin having an opening. There are a plurality of lids movably attached to the body. Each lid is configured to cover the opening of a bin and each lid has a fastening element. A release mechanism is movably attached to the body. The release mechanism is movable along an axis. A plurality of latches are movably attached to the body. Each of the plurality of latches is configured to engage the respective fastening element of the plurality of lids when in a first position and to release the respective fastening element when in a second position. The latches and release mechanism are configured such that the release mechanism will not cause a latch to move to the second position when the release mechanism is moving along the axis in a first direction and the release mechanism will cause a single latch to move to the second position while leaving the remaining latches in the first position when the release mechanism is moving along the axis in a second direction that is opposite to the first direction.

A dispensing system is disclosed. The dispensing system comprises a cartridge and a cabinet. The cartridge comprises a body having an exterior and a plurality of bins, with a plurality of lids movably attached to the body, and a connector having contacts exposed on the exterior of the body. The lids have closed positions wherein the lids cover the respective bins. The cartridge is configured such that the lids cannot be opened except by receipt of a command signal by the cartridge through the connector. The cabinet comprises a housing having a docking location configured to accept a cartridge, a docking connector attached to the housing, and a controller coupled to the docking connector. The housing is configured such that the docking connector connects to the cartridge connector when the cartridge is placed on the docking location. The controller is configured to send the command signals to the cartridge via the docking connector to open one of the lids.

A method of providing access to a single bin of a cartridge having a plurality of bins is disclosed. The method includes the step of moving a latch driver along an axis of motion. The latch driver has an actuation mode and a bypass mode. The latch driver will not actuate a latch while moving in a first direction while in the actuation mode but will actuate the latch to open a lid covering the bin while moving in a second direction while in the actuation mode, the second direction being opposite of the first direction. The latch driver will not actuate the latch when moving in either the first or second direction while in the bypass mode. The method also includes the steps of switching the latch driver to bypass mode upon reaching a first end of a range of motion while moving in the first direction along the axis of motion, moving the latch driver in the second direction over the entire range of motion, switching the latch driver to actuation mode upon reaching a second end of the range of motion while moving in the second direction along the axis of motion, moving the latch driver in the first direction until the latch driver passes the latch, and moving the latch driver in the second direction until the latch driver displaces the latch sufficient to disengage the latch from the lid, allowing the lid to open and allowing access to the bin.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
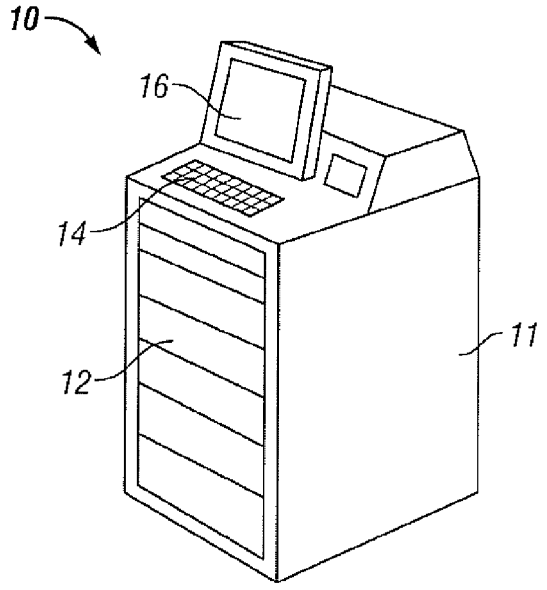
FIG. 1 depicts an ADM used in medical facilities.

Pharmacists are under increasing pressure to manage the medications that are provided to nurses and other caregivers in a medical facility. There is an increasing level of regulation, particularly for controlled substances, related to the handling and tracking of medications. Many of these regulations require a pharmacist to perform certain checks on medications, increasing the workload of a pharmacist. Controlled substances, which may include medications listed on Schedules I-V of the Controlled Substances Act. In addition, many hospitals are finding that they cannot locate pharmacists to fill open positions, placing greater burdens on the pharmacists that are on the hospital staff. There is therefore a need to manage medications with a reduced amount of pharmacist time.

The disclosed cartridge, system, and method enable a pharmacist to make medications in an ADM available to nurses at a reduced level of pharmacist effort. A cartridge can be filled and verified by a pharmacist in the pharmacy and then securely transported to an ADM and loaded into the ADM by a non-pharmacist employee such as a pharmacy technician. Alternately, the medications can be verified in the pharmacy by a pharmacist and then transported to the ADM by a pharmacy technician who then loads the mediations into the cartridge. As the compartments cannot be opened when the cartridge is not installed in an ADM or equivalent loading station in the pharmacy, the pharmacist does not need to inspect the cartridge again at the ADM.

Certain exemplary embodiments of the present disclosure include a cartridge having a plurality of bins with individually openable lids. This cartridge is suitable for single-dose dispensing as a single dose of medication may be placed in each compartment. Opening a single lid provides the caregiver with access to that single dose without providing the caregiver access to other doses. This eliminates the need for periodic verification counts of the medications, as the opportunity for undetected removal of the medication from the bins has been eliminated.

While the discussion of the cartridge, system, and method is directed to the dispensing of medications in a hospital, the disclosed methods and apparatus are applicable to dispensing of medications in other environments as well as the dispensing of other types of items in a variety of fields. For example, machine shops frequently have a tool crib staffed by an individual to provide cutters, drills, and other consumable supplies to the machinists without providing uncontrolled access to the stock of tools and parts. An ADM may be stocked with these consumables and used in place of the tool crib to provide these items to the machinists in a controlled and traceable manner. Similarly, items such as an expensive specialty tool may be removed by an individual for use and returned to the same compartment after use, enabling the tool to be tracked and making a single tool available to multiple people.

In the following detailed description, numerous specific details are set forth to provide a full understanding of the present disclosure. It will be apparent, however, to one ordinarily skilled in the art that embodiments of the present disclosure may be practiced without some of the specific details. In other instances, well-known structures and techniques have not been shown in detail so as not to obscure the disclosure.

FIG. 1 is a drawing of an ADM used in medical facilities. This example ADM 10 includes a plurality of drawers 12, some of which may be configured to receive dispensing cartridges (not shown). This configuration of an ADM can be referred to as a cabinet, which includes the housing 11, the drawers 12, a variety of electronics and controls (not shown), and the user interface. The user interface of the ADM 10 includes a display 16 and a keyboard 14 so that a user, such as a nurse, may identify which medication they wish to remove from the ADM.

Figure 2:
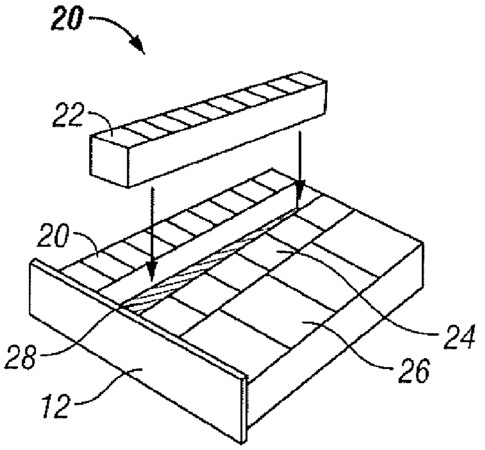
FIG. 2 depicts a dispensing cartridge insertion into an ADM drawer according to certain embodiments of the present disclosure.

FIG. 2 is a drawing showing how a dispensing cartridge 20 fits into an ADM drawer 12 according to certain embodiments of the present disclosure. In this view, a drawer 12 has been removed from the housing 11 of the ADM for clarity. Dispensing cartridges 20 may be provided in a variety of widths. In this example, cartridges 20 are of a width that may be defined as "unit width," "single width," or "1×" with a certain number of equal-size compartments 22. Cartridge 24 is of the same width as cartridge 20 with a reduced number of compartments, such that the compartments are larger and can hold larger items. Cartridge 26 is wider than cartridge 20 and has four large compartments, enabling each compartment to hold a large single item or a larger quantity of a small item. In some embodiments, wider cartridges are provided in incremental widths that are integer multiples of the 1× width. This enables a user to install a variable configuration of cartridges. In the example of FIG. 2, the drawer 12 has five 1× spaces 28, with three 1× cartridges 20 and one 2× cartridge 26 installed. Other widths of cartridges may be installed up to, in this example, a single 5× cartridge.

Figure 3:
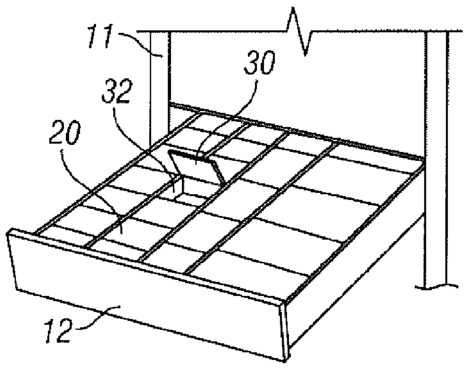
FIG. 3 shows an ADM drawer containing dispensing cartridges according to certain embodiments of the present disclosure.

FIG. 3 is a drawing of an ADM drawer 12 containing dispensing cartridges according to certain embodiments of the present disclosure. In FIG. 3, the drawer 12 of FIG. 2 is installed in housing 11 and is shown in a state after a user has requested a medication that was contained in one of the cartridges placed in drawer 12. One compartment of cartridge 20 has been opened by the ADM controller (not shown), revealing lid 30 that covered bin 32 of the compartment containing the desired medication. In this example, lid 30 is attached by a hinge to the body of cartridge 20. The lid 30 has a hook or other fastening element (not shown in FIG. 3) that enables a latch or other mechanism (not shown in FIG. 3) within the cartridge to retain the lid 30 in the closed position. The remaining lids 30 remain closed and locked, preventing access to the contents of the other compartments.

Figure 4A:
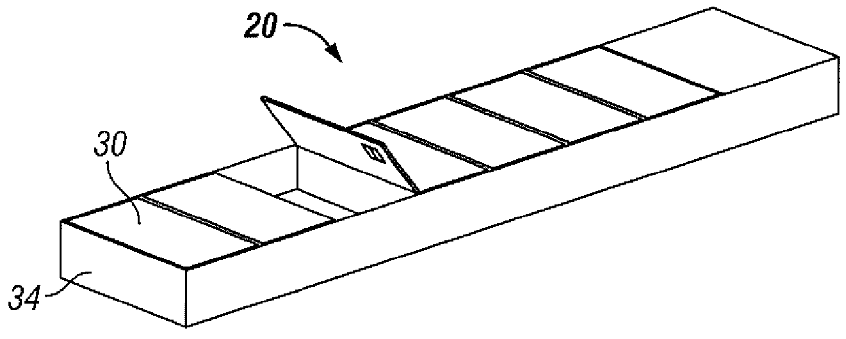
FIGS. 4A-4C illustrate an exemplary configuration of a cartridge lid-release system according to certain embodiments of the present disclosure.
Figure 4B:
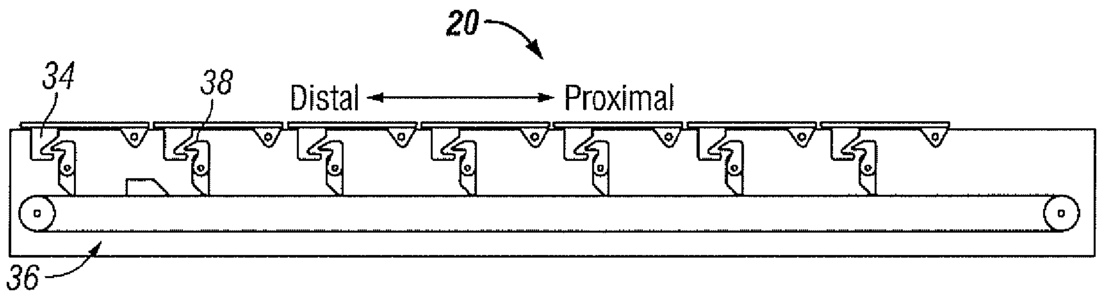
Figure 4C:
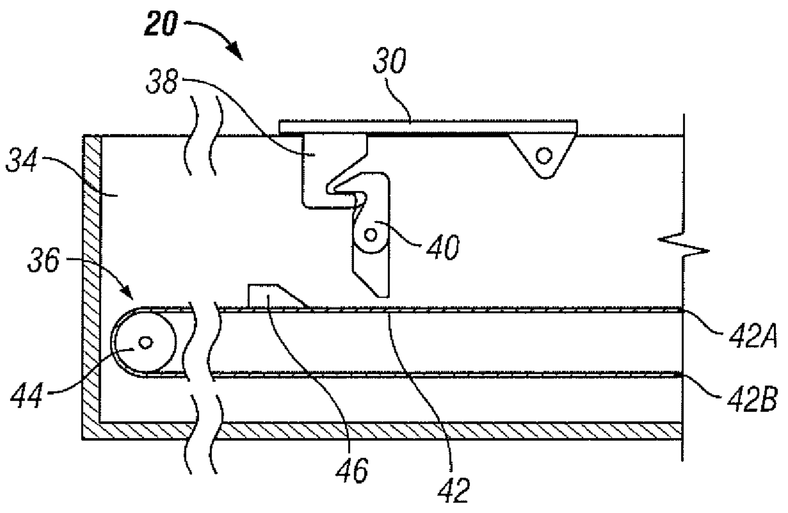

FIGS. 4A-4C illustrate an exemplary configuration of a cartridge lid-release system according to certain embodiments of the present disclosure. FIG. 4A shows a dispensing cartridge 20 having a plurality of lids 30 attached to a body 34. FIG. 4B shows a side view of cartridge 20 where a side panel has been removed from body 34 to show the release mechanism 36 and latches 38. Distal and proximal directions are herein defined relative to the cartridge 20 for discussion of operation in later sections. FIG. 4C is an enlarged view of a section of FIG. 4B. Lid 30 is shown in FIG. 4C in the closed position and has an attached hook 38 as an example fastening element. Latch 40 is engaged with hook 38 and retains lid 30 in the closed position. The details of the construction and operation of this example latch 40 are discussed below. This embodiment of release mechanism 36 includes an endless belt 42 passing over a pulley 44 at each end of the cartridge body 34, as shown in FIG. 4C. FIG. 4C is shown with a split across the body between pulley 44 and latch 40 to indicate that this same configuration of lid 30 and latch 40 are repeated at each lid along the cartridge 20. The endless belt 42 has an attached latch driver 46 that is discussed in more detail below. The endless belt 42 has an upper or first path 42A and a lower or second path 42B, and the latch driver 46 may travel the full circumference of the endless belt, traveling along either first path 42A or second path 42B in either the proximal or distal direction. In this example, the endless belt 42 is moved in either direction by rotation of one of the pulleys 44 as driven by a motor (not shown).

Figure 5A:
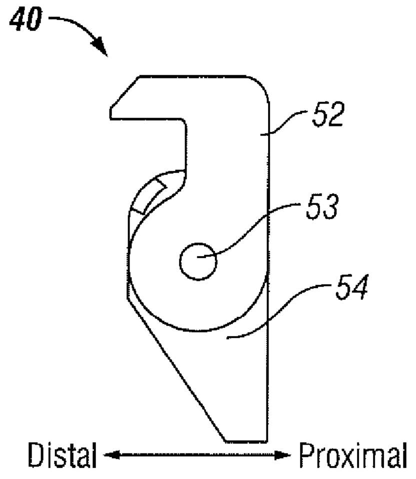
FIGS. 5A-5E illustrate a cartridge lid latch according to certain embodiments of the present disclosure.
Figure 5B:
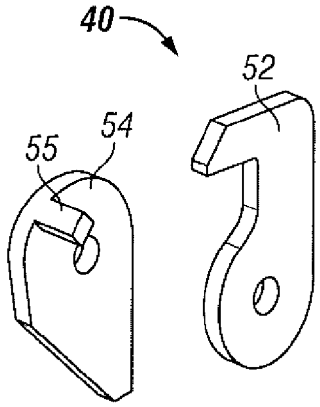

FIGS. 5A-5E illustrate the construction of a cartridge lid latch 40 according to certain embodiments of the present disclosure. FIG. 5A is a side view of the latch 40 showing the upper latch arm 52 and lower latch arm 54, both of which pivot about an axle 53. Axle 53 may be a part of the body to which the latch 40 is attached or may be a separate item. The distal and proximal directions of FIG. 4B are repeated for the example embodiment shown herein. FIG. 5B is a perspective and exploded view of latch 40, wherein a stop bar 55 of upper latch arm 54 is visible. In operation, a biasing element (not shown), such as a torsional spring, urges the upper latch arm 52 to rotate counterclockwise about axle 53 to the position shown in FIG. 5A. Similarly, a biasing element (not shown) urges lower latch arm 54 to rotate clockwise about axle 53 to the position shown in FIG. 5A. In some embodiments, a single biasing element may provide both functions while multiple biasing elements may be used in alternate embodiments.

Figure 5C:
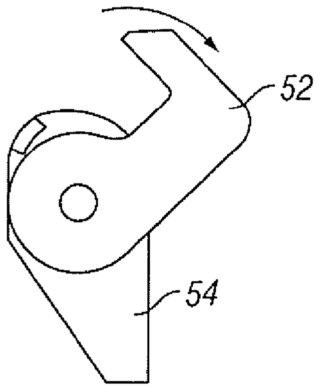
Figure 5D:
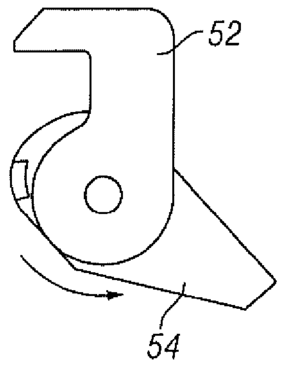
Figure 5E:
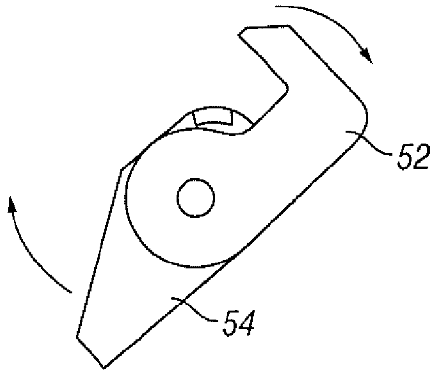

FIG. 5C shows one degree of freedom of motion of latch 40, wherein upper latch arm 52 rotates clockwise about axle 53 while lower latch arm 54 remains in its original position. FIG. 5D shows a second degree of freedom of motion of latch 40 wherein lower latch arm 54 rotates counterclockwise while the upper latch arm 52 remains in its original position. FIG. 5E shows another degree of freedom wherein lower latch arm 54 rotates clockwise and stop bar 55 engages the upper latch arm 52, causing upper latch arm 52 to also rotate clockwise. It can be seen that the motions of FIGS. 5C-5E are all opposed by the action of the respective biasing elements, so that each element will return to the position of FIG. 5A in the absence of an applied force. The points where these motions occur during operation of release mechanism 36 will be discussed below.

Figure 6A:
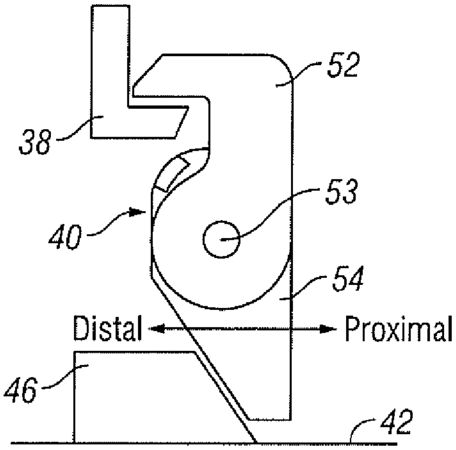
FIGS. 6A-6F illustrate an operational sequence to release a cartridge lid latch according to certain embodiments of the present disclosure.
Figure 6B:
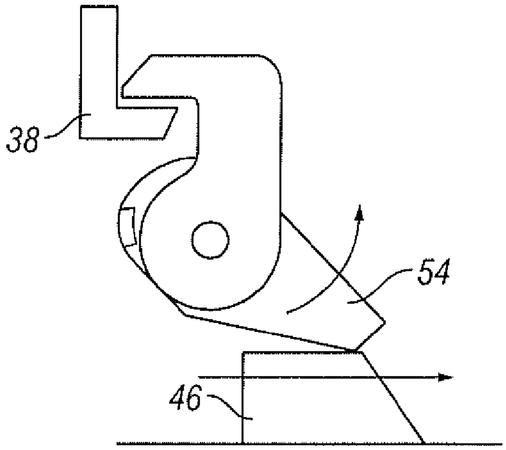
Figure 6C:
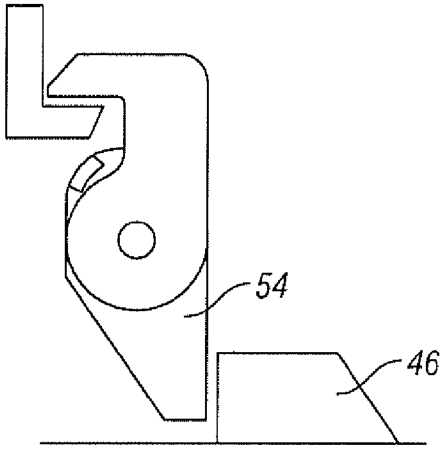
Figure 6D:
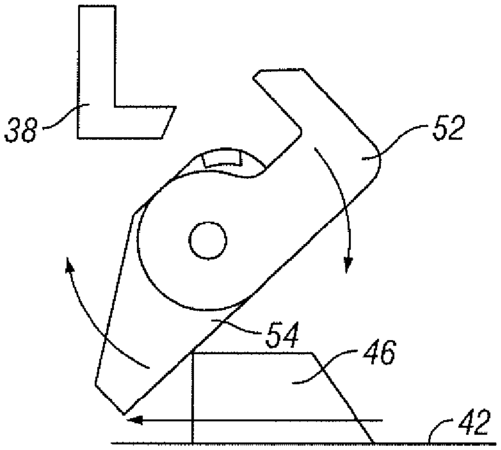
Figure 6E:
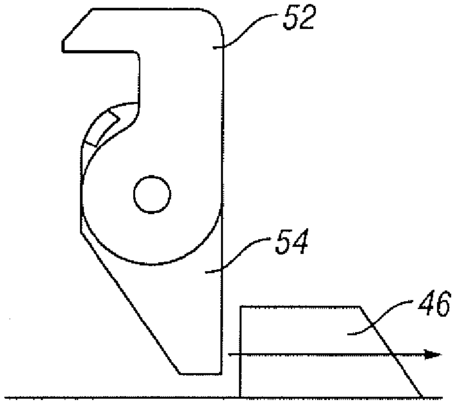
Figure 6F:
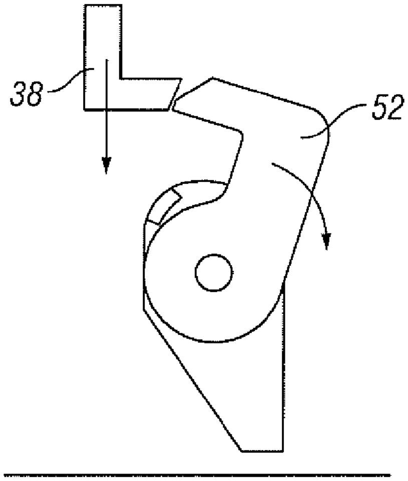

FIGS. 6A-6F illustrate an operational sequence to release a cartridge lid latch according to certain embodiments of the present disclosure. FIG. 6A shows a starting position wherein latch 40 is in a stable configuration and engaged with hook 38. Latch driver 46 is attached to endless belt 42 and is positioned on the distal side of latch 40. It can be seen that latch driver 46 and latch 40 have matching inclined surfaces. In FIG. 6B, latch driver 46 is moving in the proximal direction, as indicated by the arrow, forcing lower latch arm 54 to rotate counterclockwise. It can be seen that this motion does not release hook 38. FIG. 6C shows latch driver 46 as having passed lower latch arm 54 and stopped on the proximal side of latch 40, wherein lower latch arm 54 has returned to the position of FIG. 6A. In FIG. 6D, belt 42 has reversed direction and latch driver 46 is moving in the distal direction and is forcing lower latch arm 54 to rotate clockwise, which causes upper latch arm 52 to also rotate clockwise. Clockwise rotation of upper latch arm 52 releases hook 38. In this example, there is a biasing element (not shown) urging the lid to which hook 38 is attached to open, whereupon hook 38 moves upward and out of engagement position for upper latch arm 52. In FIG. 6E, latch driver 46 has again moved to the proximal side of latch 40 and allowed latch 40 to return to the position of FIG. 6A. FIG. 6F shows how hook 38 moves downward and engages upper latch arm 52 as the lid (not shown) is closed, as upper latch arm 52 rotates clockwise to allow hook 38 to pass the engagement feature of upper latch arm 52 and move to the engagement position of FIG. 6A, whereupon upper latch arm 52 will rotate counterclockwise under the urging of the biasing element (not shown) and the system will return to the configuration of FIG. 6A.

Figure 7A:
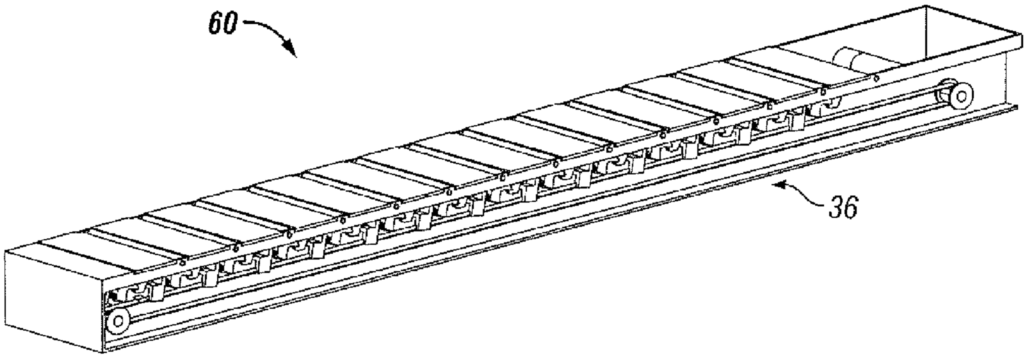
FIGS. 7A-7B illustrate an alternate embodiment of a cartridge lid latch and lid-release system according to certain embodiments of the present disclosure.
Figure 7B:
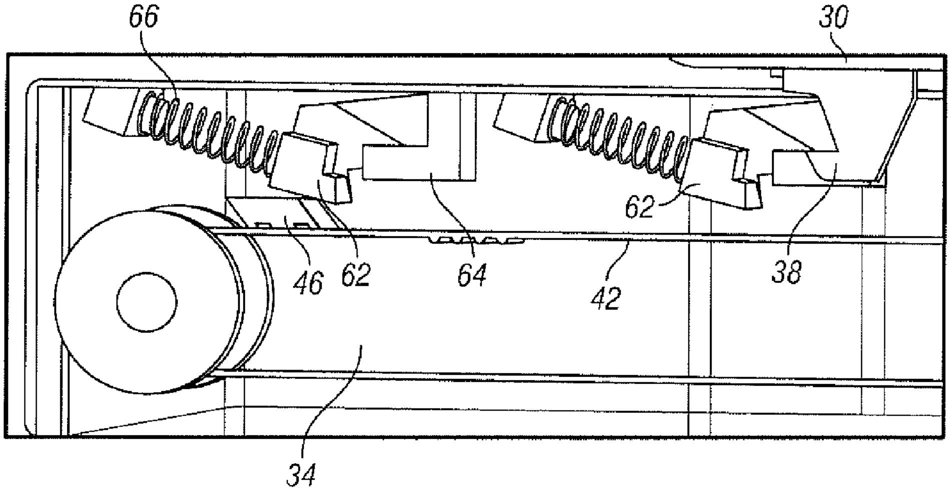

FIGS. 7A-7B illustrate an alternate embodiment of a cartridge lid latch and lid-release system according to certain embodiments of the present disclosure. FIG. 7A shows a dispensing cartridge 60 having the same release mechanism 36 as shown in FIGS. 4A-B, with a different latch (not shown). FIG. 7B shows an enlarged view of the distal end of cartridge 60, wherein two latches 62 are visible. The proximal latch 62 is shown engaged with hook 38 of lid 30. It can be seen that latch 62 does not rotate about a fixed axle and, instead, slides and rotates within a partial cavity 64 formed in the body 34. A biasing element 66, which is a spring in this example, applies force to latch 62 in the downward and proximal direction.

Figure 8A:
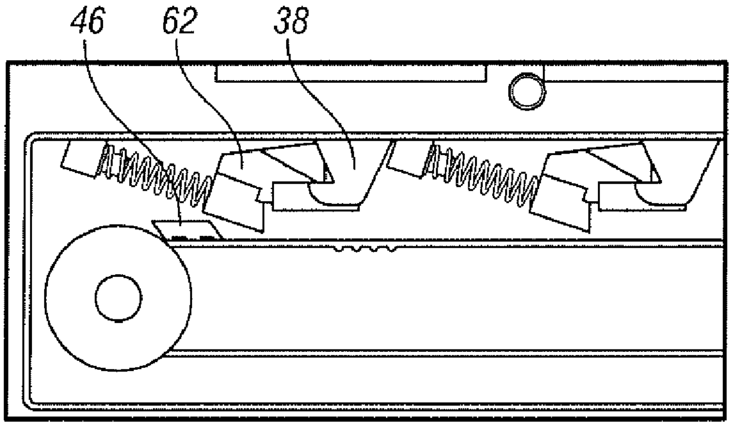
FIGS. 8A-8G illustrate an operational sequence for the lid latch configuration of FIGS. 7A-7B according to certain embodiments of the present disclosure.
Figure 8B:
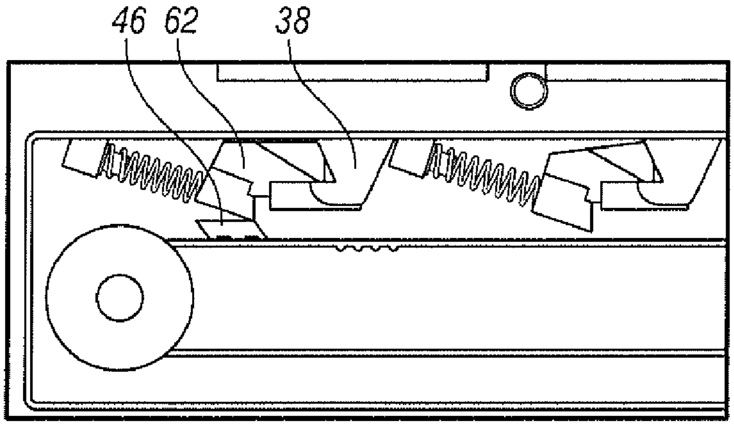
Figure 8C:
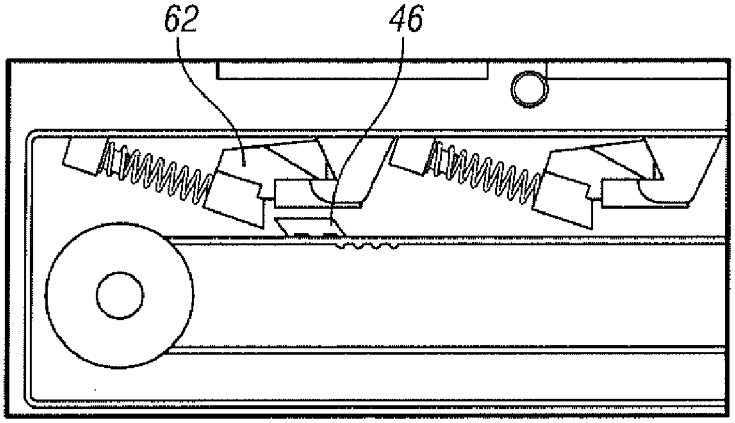
Figure 8D:
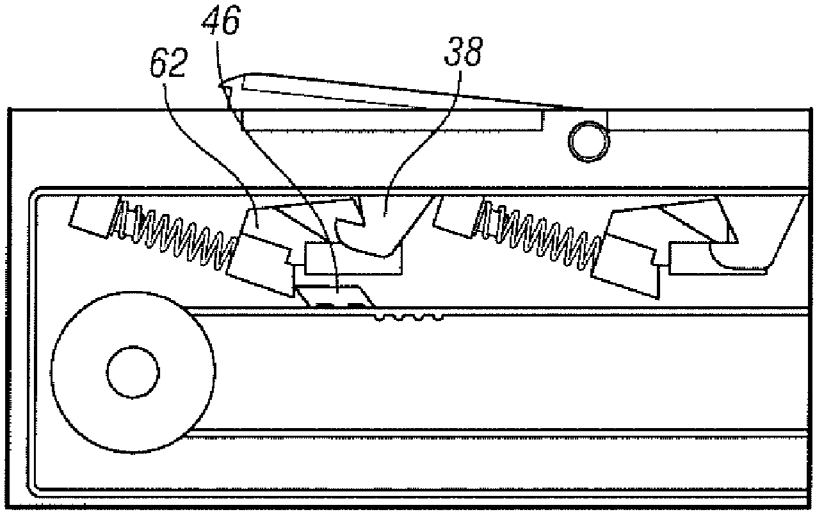
Figure 8E:
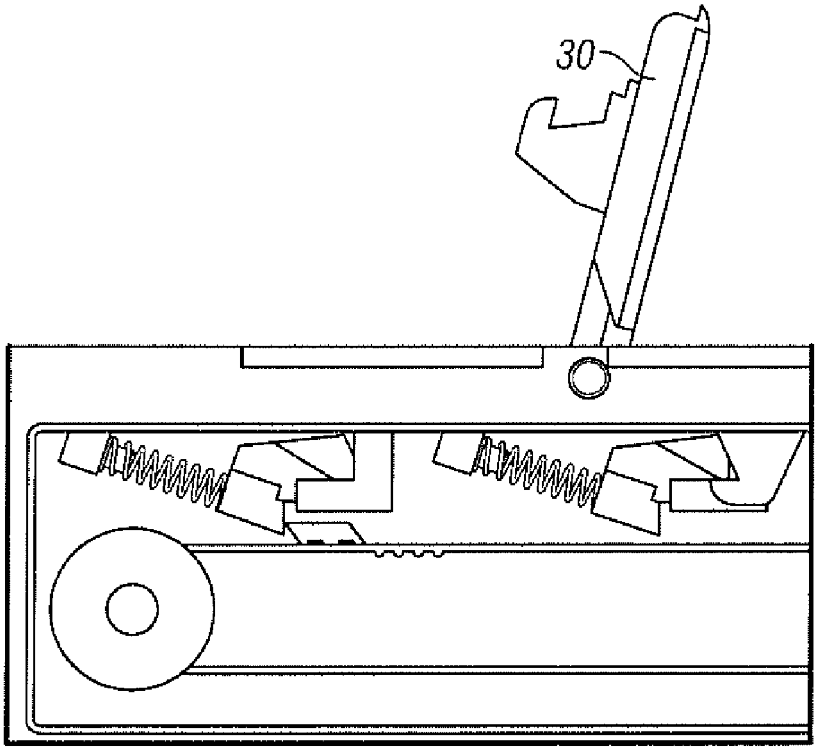
Figure 8F:
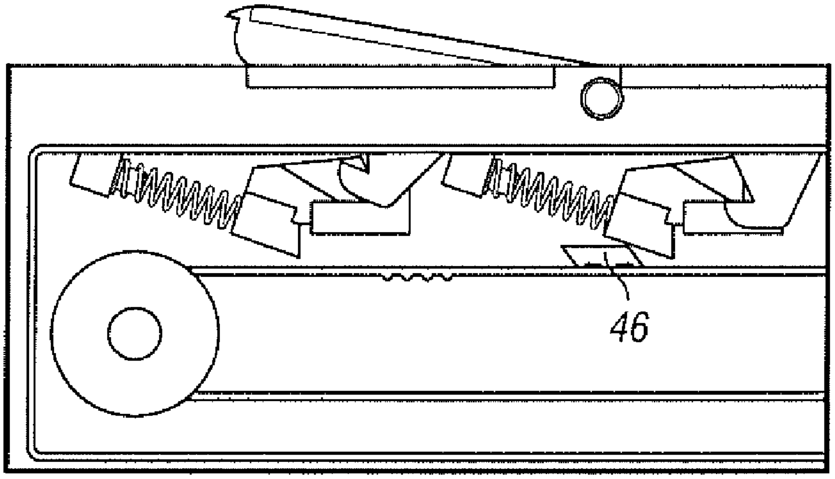
Figure 8G:
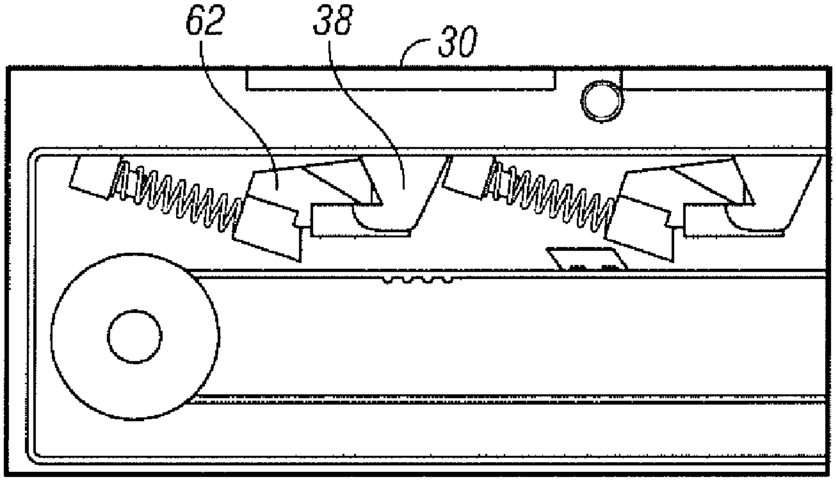

FIGS. 8A-8G illustrate the operations sequence for the lid latch configuration of FIGS. 7A-B according to certain embodiments of the present disclosure. FIG. 8A depicts a starting position where latch 62 is in the fully down position and engaged with hook 38 with latch driver 46 positioned to the distal side of latch 62. FIG. 8B shows latch driver 46 pushing latch 62 upwards as it passes under the latch 62, with latch 62 remaining engaged with hook 38. FIG. 8C shows latch driver 46 stopped on the proximal side of latch 62 that has returned to its fully down position. In FIG. 8D, latch driver 46 is moving in the distal direction and forcing latch 62 in the distal direction as well, causing latch 62 to disengage from hook 38. FIG. 8E shows the lid 30 fully opened by its biasing element (not shown). FIG. 8F shows latch driver 46 moved distally out of the way of the open lid 30 and associated latch 62, which has returned to its fully down position. Hook 38 is visible as close to but not yet in contact with latch 62. It can be seen that there are mating inclined surfaces on both hook 38 and latch 62 that will force latch 62 to move distally as the hook 38 descends. FIG. 8G shows the lid 30 fully closed and hook 38 engaged with latch 62, which has returned to the original position of FIG. 8A.

Figure 9A:
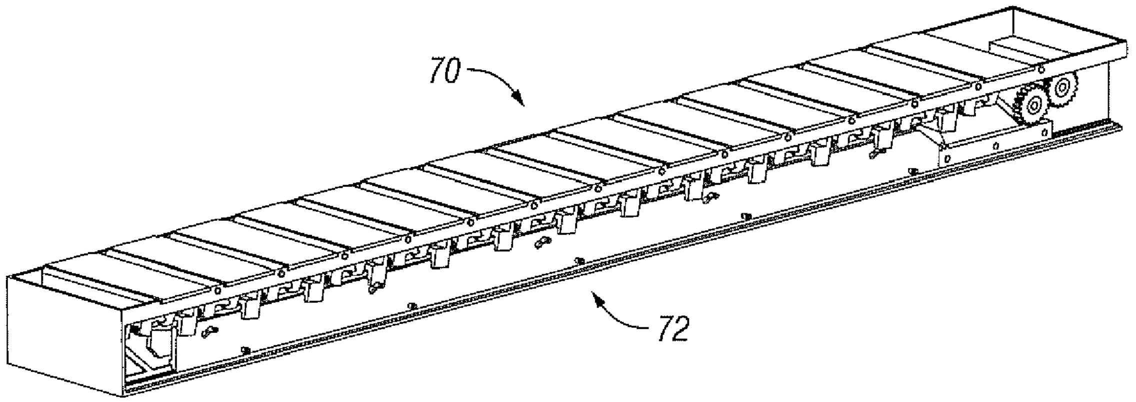
FIGS. 9A-9B illustrate an alternate embodiment of the latch release system of a cartridge according to certain embodiments of the present disclosure.
Figure 9B:
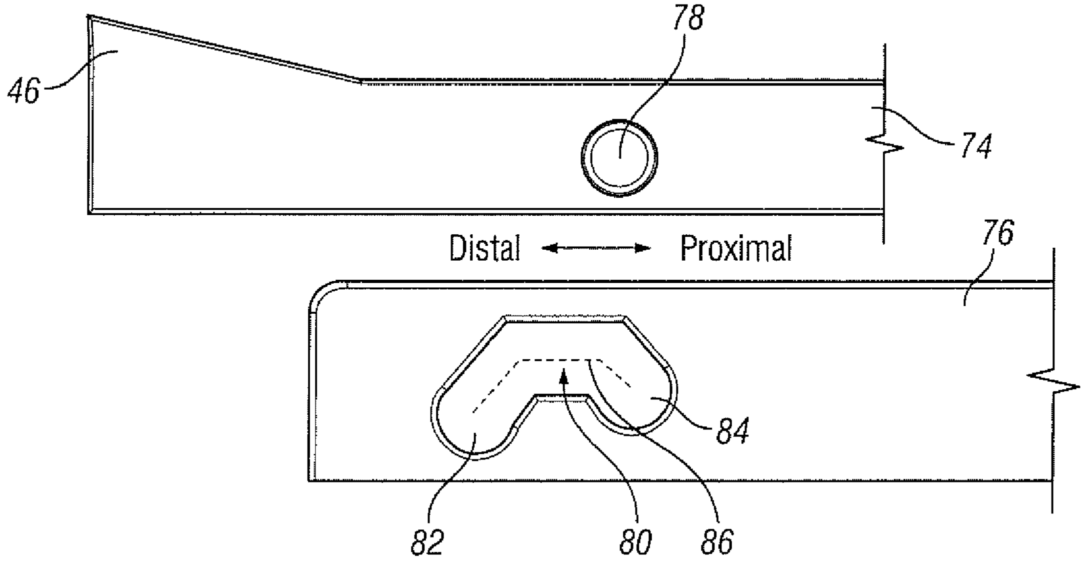

FIGS. 9A-9B illustrate an alternate embodiment of the latch release system of a cartridge according to certain embodiments of the present disclosure. Cartridge 70 is similar to the cartridges 20 and 40 of FIGS. 4A and 7A, respectively, except that the release mechanisms have been replaced by release mechanism 72. FIG. 9B shows an enlarged side view of the distal end of two components of release mechanism 72, inner slide 74 and outer slide 76. Inner slide 74 has an attached post 78 that protrudes towards the outer slide 76 and fits through the shaped hole 80. The shaped hole 80 has detent positions 82 and 84 at the distal and proximal ends, respectively, with a centerline path 86 connecting the two detent positions. The two slides 74,76 are positioned adjacent to each other when installed in cartridge 70, with post 78 protruding through shaped hole 80. Inner slide 74 may move parallel to outer slide 76 along a path defined by the motion of post 78 along centerline path 86. Inner slide 74 also includes latch driver 46 as a shaped element that is an integral part of the slide. The equivalence of this shaped element to the latch driver of previous embodiments is discussed below.

Figure 10A:
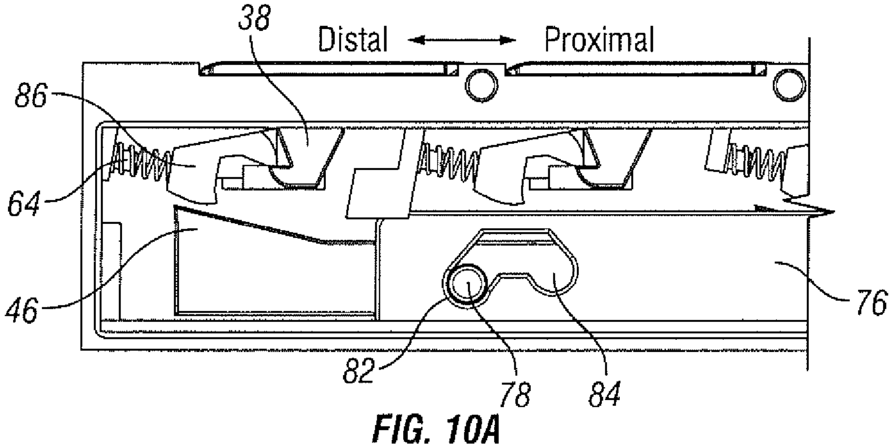
FIGS. 10A-10H illustrate an operational sequence for the lid latch configuration of FIGS. 9A-9B according to certain embodiments of the present disclosure.
Figure 10B:
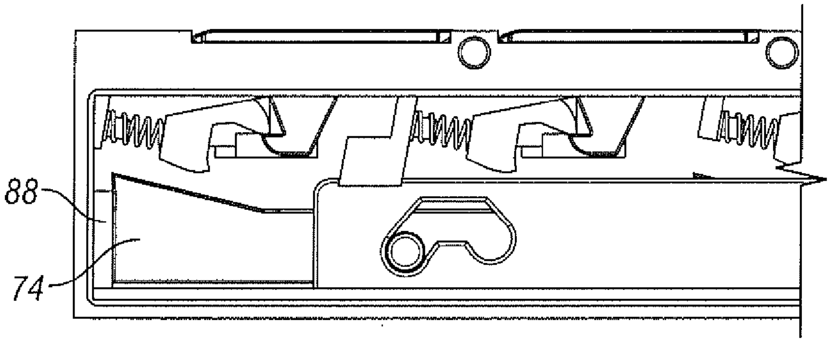
Figure 10C:
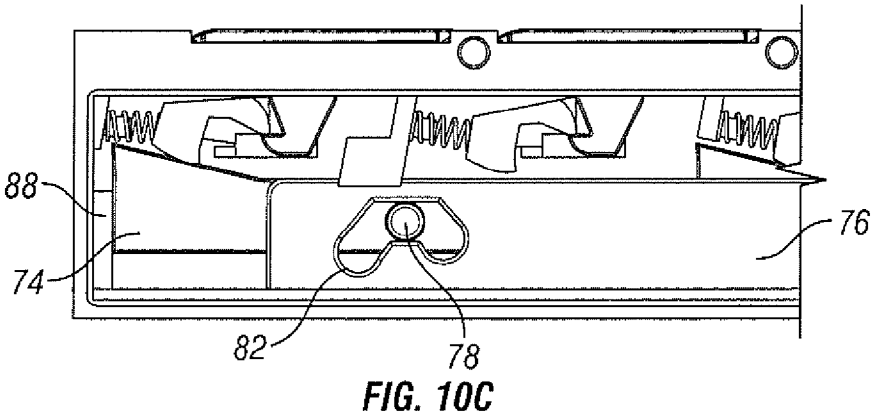
Figure 10D:
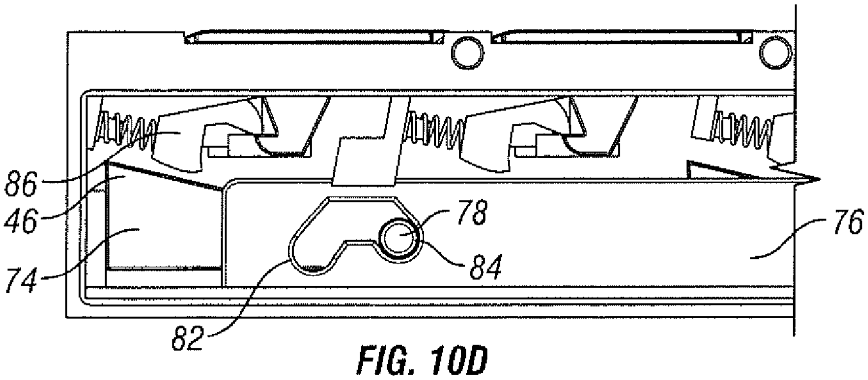

FIGS. 10A-10H illustrate the operational sequence for the lid latch configuration of FIGS. 9A-9B according to certain embodiments of the present disclosure. FIG. 10A shows a starting position where post 78 is located in detent 82. In this configuration, inner slide 74 is at it lowest position relative to outer slide 76 and it can be seen that the tip of latch driver 46 is lower than the lowest part of latch 86 and will pass under without touching latch 86. This is a "bypass mode" of this embodiment. Latch 86 again is a sliding latch with a biasing element 64 forcing it down and in a proximal direction. In FIG. 10B, outer slide 76 has been moved distally until the end of inner slide 74 comes into contact with distal travel stop 88. FIG. 10C shows outer slide 76 continuing to move in a distal direction, forcing post 78 to move out of detent 82 and follow the shaped path upwards, which forces inner slide 74 to move upwards as well. FIG. 10D shows that outer slide 76 has moved distally far enough that post 78 has reached detent 84, stopping the motion of outer slide 76. As detent 84 is higher than detent 82, latch driver 46 is now higher relative to latch 86 and can be seen to be high enough to engage latch 86 as it passes under latch 86.

Figure 10E:
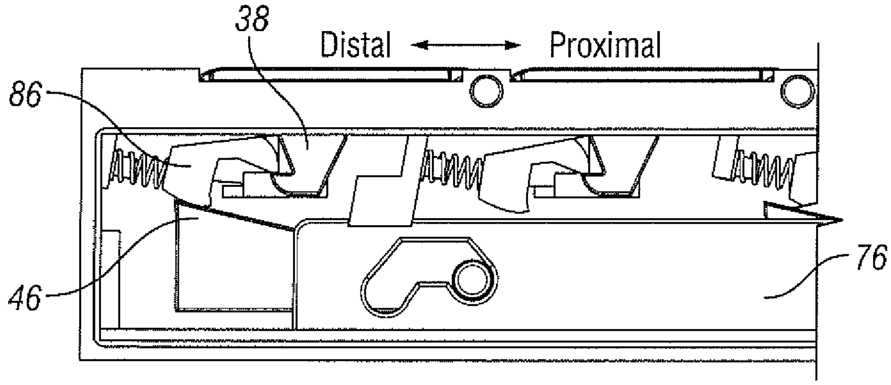
Figure 10F:
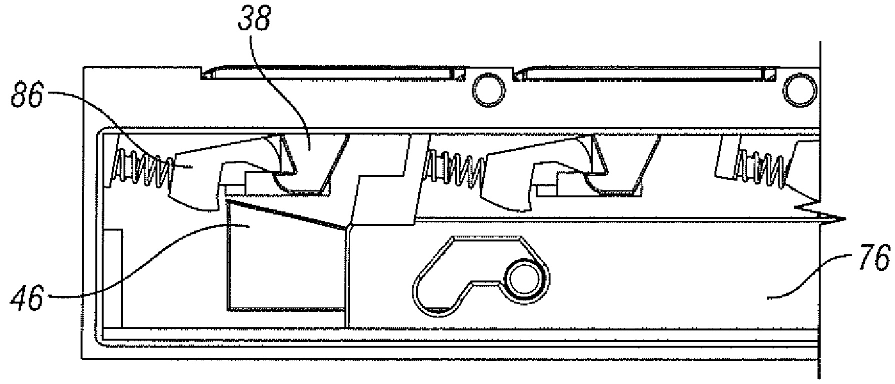
Figure 10G:
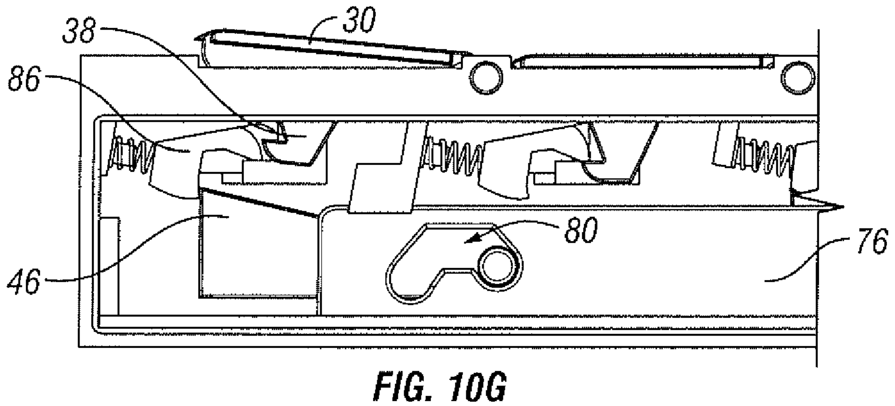
Figure 10H:
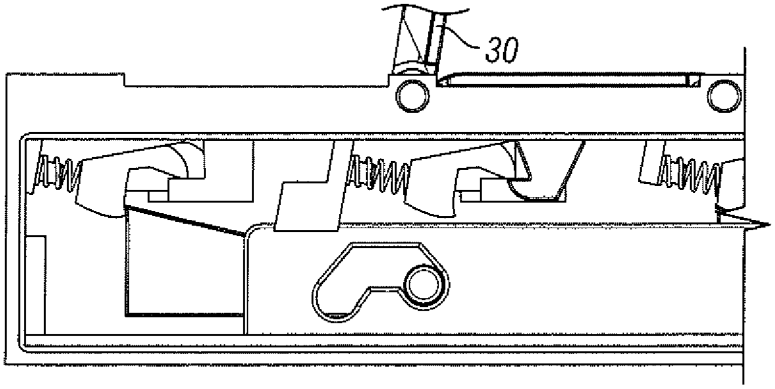

In FIG. 10E, outer slide 76 is moving in the proximal direction. Latch driver 46 is forcing latch 86 upwards as latch driver 46 passes under latch 86 without causing latch 86 to disengage hook 38. Outer slide 76 could continue to move proximally and latch driver 46 could pass under additional latches 86 such that a single latch driver could selectively open any of a plurality of latches. In FIG. 10F, outer slide 76 has moved further proximally such that latch driver is now on the proximal side of latch 86. FIG. 10G shows how outer slide 76 again moves in a distal direction. Latch driver 46 is now in its "actuation mode", i.e. in the higher position of shaped hole 80, and so latch driver 46 pushes latch 86 in the distal direction, which causes latch 86 to disengage from hook 38. FIG. 10H shows lid 30 fully open. This embodiment will re-engage upon closure of lid 30 in much the same way as shown in FIGS. 8F-8G for the prior embodiment.

Figure 11A:
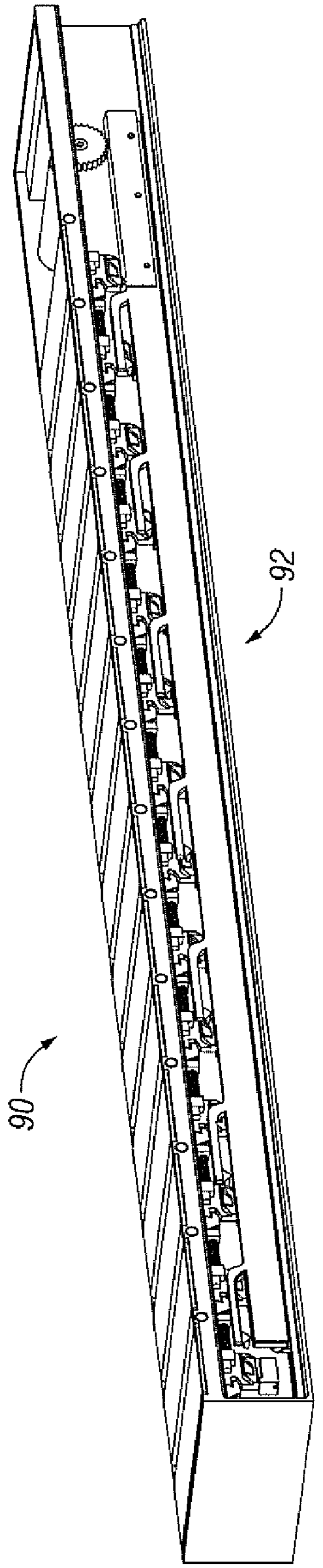
FIGS. 11A-11D illustrate an alternate embodiment of the latch release system of a cartridge according to certain embodiments of the present disclosure.
Figure 11B:
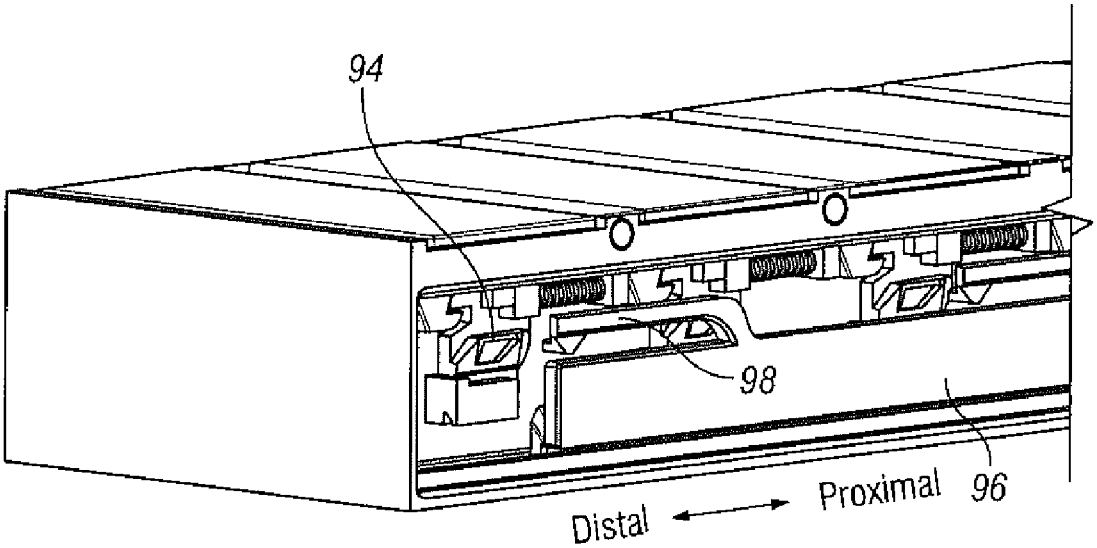
Figure 11C:
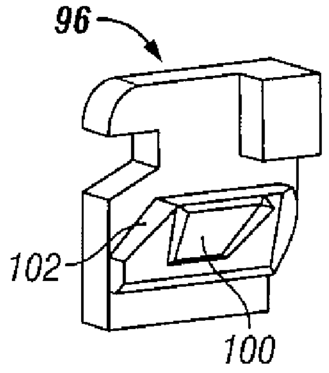
Figure 11D:
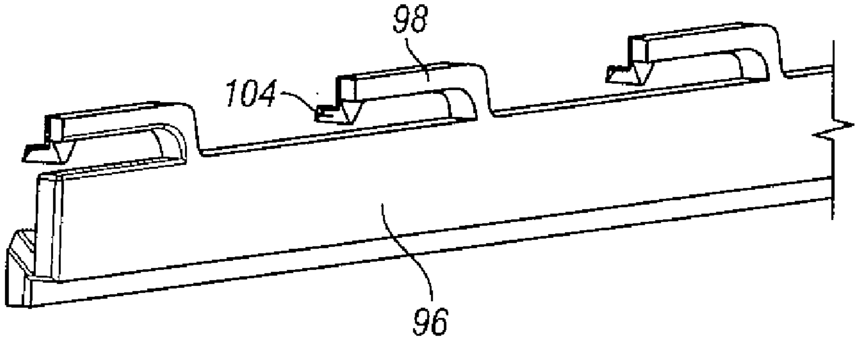

FIGS. 11A-11D illustrate an alternate embodiment of the latch release system of a cartridge according to certain embodiments of the present disclosure. FIG. 11A shows a dispensing cartridge 90 having a different latch and release mechanism than the previous cartridge embodiments. FIG. 11B is a close-up view of the distal end of cartridge 90, showing a latch 94 and a sliding carrier 96 having flexible arms 98. Latch 94 and sliding carrier 96 are shown at an even larger scale in FIG. 11C and FIG. 11D, respectively. In FIG. 11C, it can be seen that latch 94 has a shaped cavity 100 and a diverter path 102, the function of which will be discussed below. In FIG. 11D, it can be seen that flexible arms 98 have tips 104.

Figure 12A:
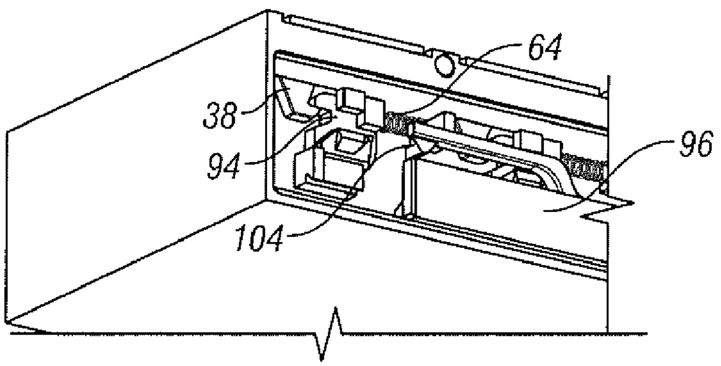
FIGS. 12A-12H illustrate an operational sequence to release a lid for the lid latch configuration of FIGS. 11A-11D according to certain embodiments of the present disclosure.
Figure 12B:
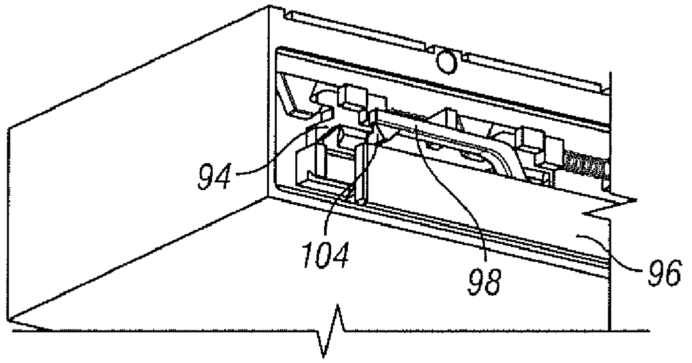
Figure 12C:
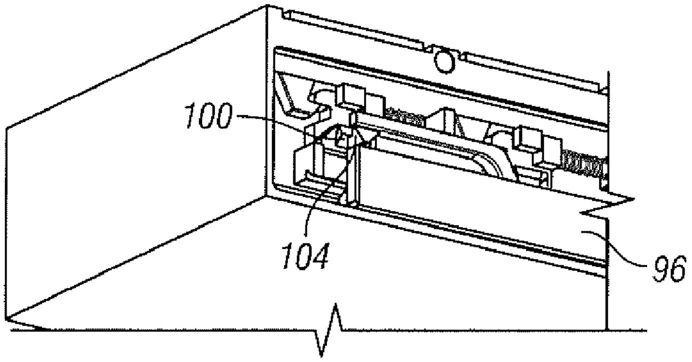
Figure 12D:
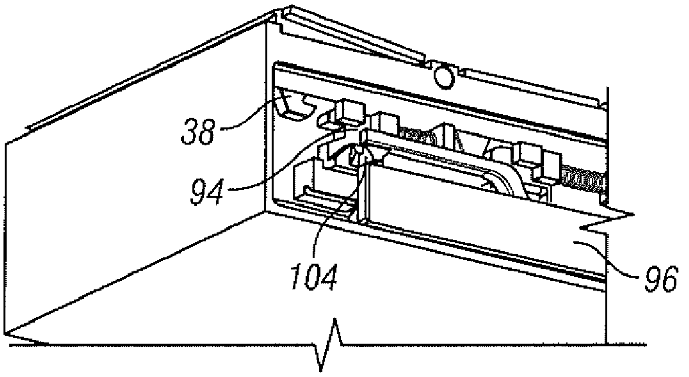

FIGS. 12A-12H illustrate the operations sequence to release a lid for the lid latch configuration of FIGS. 11A-11D according to certain embodiments of the present disclosure. FIG. 12A shows the sliding carrier 96 in an initial position where tip 104 is not in contact with latch 94. This embodiment of latch 94 moves only along a distal-proximal axis and engages hook 38 at the distal end of travel, as shown in FIG. 12A. Biasing element 64, which is a spring in this embodiment, can be seen to be urging latch 94 to move in a distal direction. In FIG. 12B, sliding carrier 96 has moved distally such that tip 104 is in contact with the outer surface of latch 94, forcing the flexible arm 98 to bend outward. FIG. 12C shows the sliding carrier as having moved further distally such that tip 104 is now in contact with shaped cavity 100. The shaped cavity 100 has a sloped surface on the distal side such that, if sliding carrier 96 continues to move in distal direction then tip 104 will ride up and out of shaped cavity 100. Shaped cavity 100 has a straight or undercut edge on the proximal side such that tip 104 will not ride out of the shaped cavity 100 but will, instead, engage the edge. FIG. 12D shows this situation, where sliding carrier 96 has reversed direction such that tip 104 has reached the proximal edge of shaped cavity 100 and engaged, or snagged, the proximal edge of shaped cavity 100. As sliding carrier 96 continues to move proximally, tip 104 will pull latch 94 in the proximal direction, releasing the hook 38 as shown in FIG. 12D.

Figure 12E:
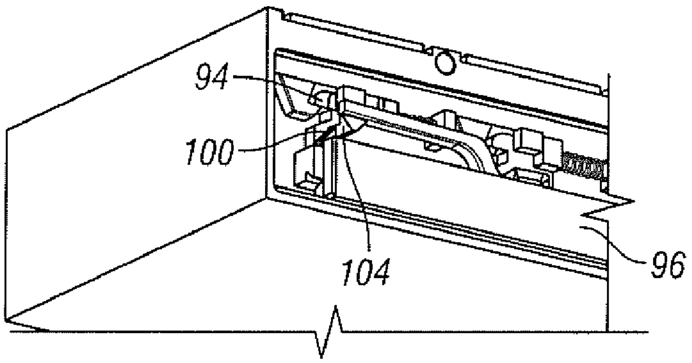
Figure 12F:
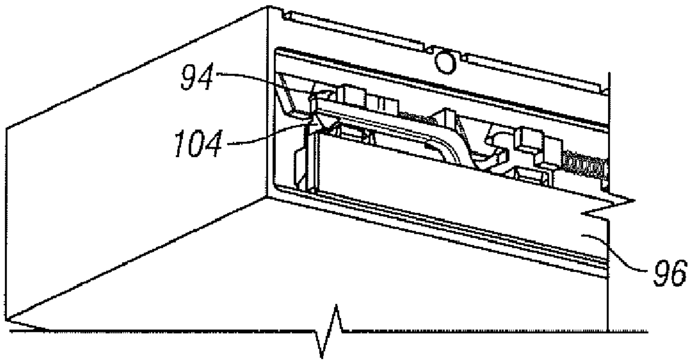
Figure 12G:
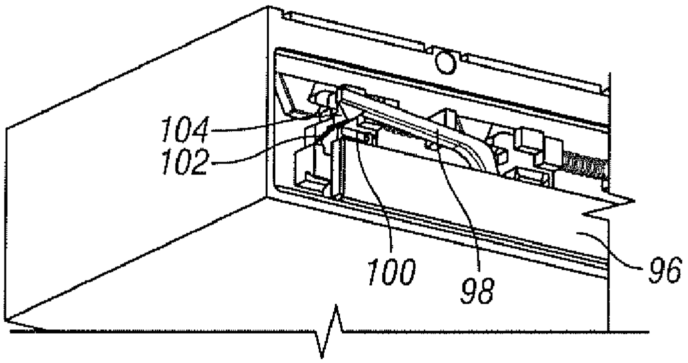
Figure 12H:
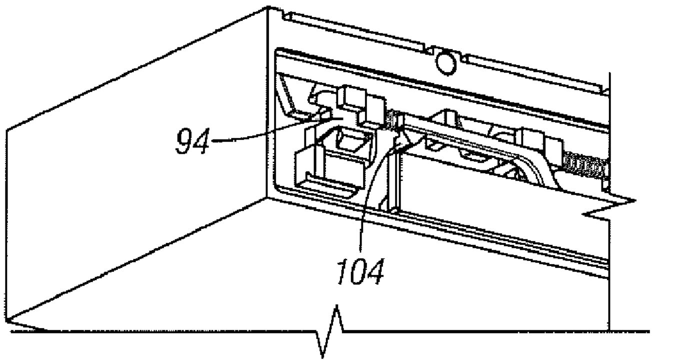

FIG. 12E continues from the configuration of FIG. 12C where the tip 104 is in contact with the shaped cavity 100. The shaped cavity 100 has a sloped surface on the distal side such that, if sliding carrier 96 continues to move in distal direction then tip 104 will ride up and out of shaped cavity 100. FIG. 12E shows tip 104 riding on the outer surface of latch 94 on the distal side of shaped cavity 100, having followed the sloped surface up out of shaped cavity 100. FIG. 12F shows the configuration after the sliding carrier 96 has moved further distally such that tip 104 is not in contact with latch 94. In FIG. 12G, sliding carrier 96 has reversed direction and is traveling in a proximal direction. As tip 104 comes into contact with the outer surface of latch 94, approaching from the distal side of the latch 94, tip 104 follows diverter path 102. As tip 104 follows diverter path 102, flexible arm 98 bends upwards. Diverter path 102 continues around shaped cavity 100 and tip 104 will not engage latch 94. FIG. 12H shows the configuration after tip 104 is no longer in contact with the outer surface of latch 94, which is identical to FIG. 12A.

Figure 13A:
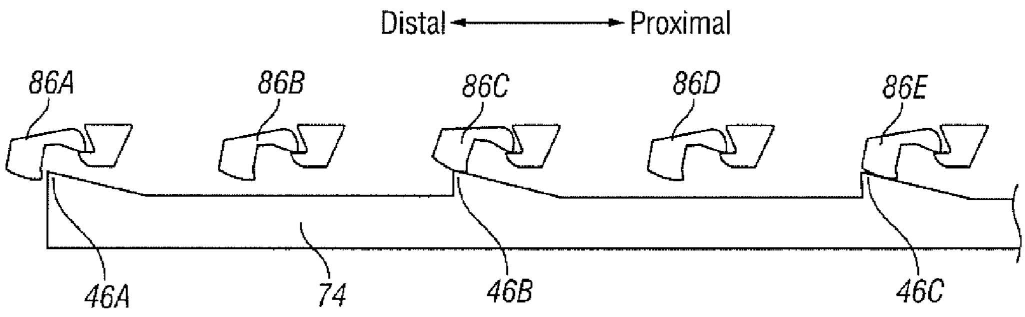
FIGS. 13A-13E illustrate an exemplary embodiment of a latch-release system according to certain embodiments of the present disclosure.

FIGS. 13A-13E illustrate an exemplary embodiment of a latch-release system according to certain embodiments of the present disclosure. FIG. 13A shows a distal portion of inner slide 74 of the release mechanism of FIGS. 11A-11D and five identical, evenly spaced latches 86A-86E at the distal end of a cartridge 70. Inner slide 74 includes three latch drivers 46A-46C within the portion of inner slide 74 shown in FIG. 13A. The latch drivers 46A-46C are spaced at an interval slightly less than twice the interval of the latches. In FIG. 13A, latch driver 46A is touching the proximal edge of latch 86A such that a slight distal movement of inner slide 74 will cause latch 86A to release its respective hook 38. At the same time, latch drivers 46B and 46C are pushing latches 86C and 86E, respectively, upward and the distal movement of inner slide 74 will not cause either latch 86C or 86E to release their respective hooks 38. Thus, inner slide 74 is positioned such that a small distal movement, i.e. a movement that is a fraction of the interval between latches, of inner slide 74 will release the lid over latch 86A while not releasing the other four lids over latches 86B-86E.

Figure 13B:
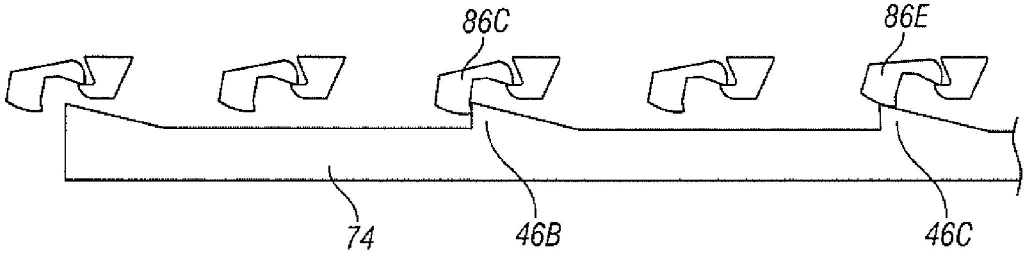

In FIG. 13B, inner slide 74 has moved proximally to a position where latch driver 46B is in contact with latch 86C such that a small distal movement of inner slide 74 will cause latch 86C to release its respective hook. At the same time latch driver 46C is pushing latch 86E upwards and a distal movement of inner slide 74 will not cause latch 86E to release its respective hook. Thus, inner slide 74 is positioned such that a small distal movement of inner slide 74 will release the lid over latch 86C while not releasing the other four lids over latches 86A-86B and 86D-86E.

Figure 13C:
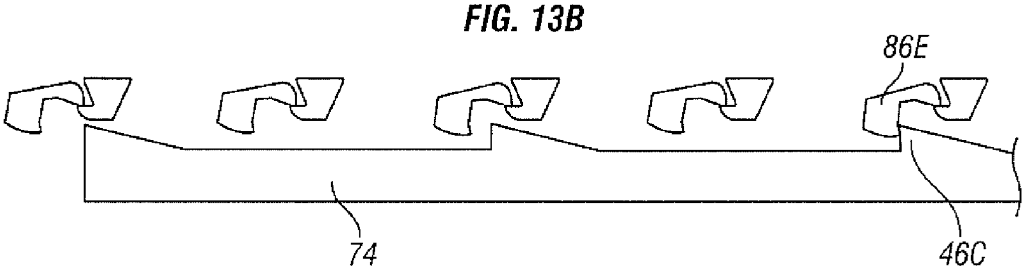
Figure 13D:
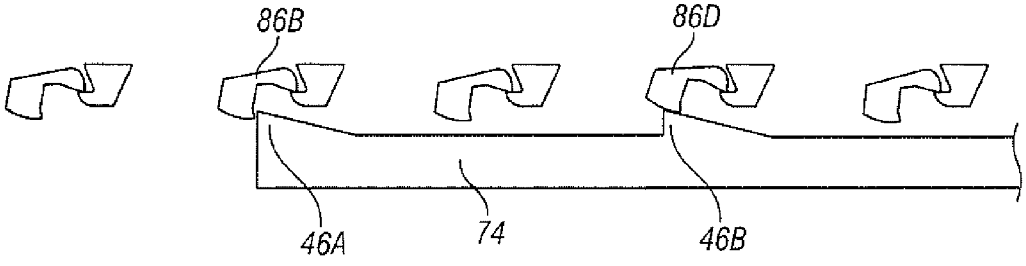
Figure 13E:
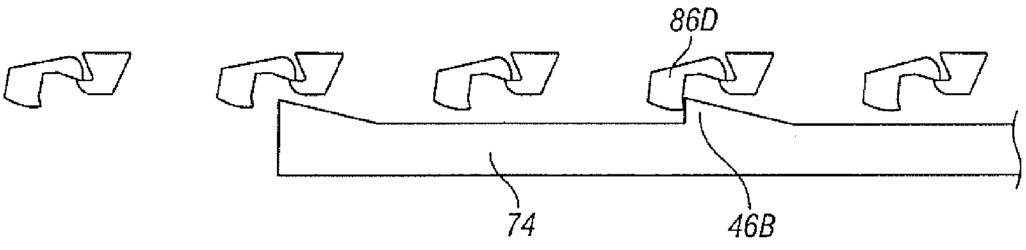

Similarly, it can be seen that in FIG. 13C, inner slide 74 is positioned to release latch 86E without releasing the other latches. FIG. 13D shows inner slide 74 positioned to release latch 86B and FIG. 13E shows inner slide 74 positioned to release latch 86D. FIGS. 13A-13E collectively show how a release mechanism, embodied as inner slide 74 in this example, can selectively release one of a plurality of lids without releasing the remaining lids by selection of a spacing, or pitch, between latch drivers that is less than an integral multiple of the spacing of the latches. This same approach may be applied to the flexible arms 98 and tips 104 of the embodiment of FIGS. 11A-11D.

Figure 14:
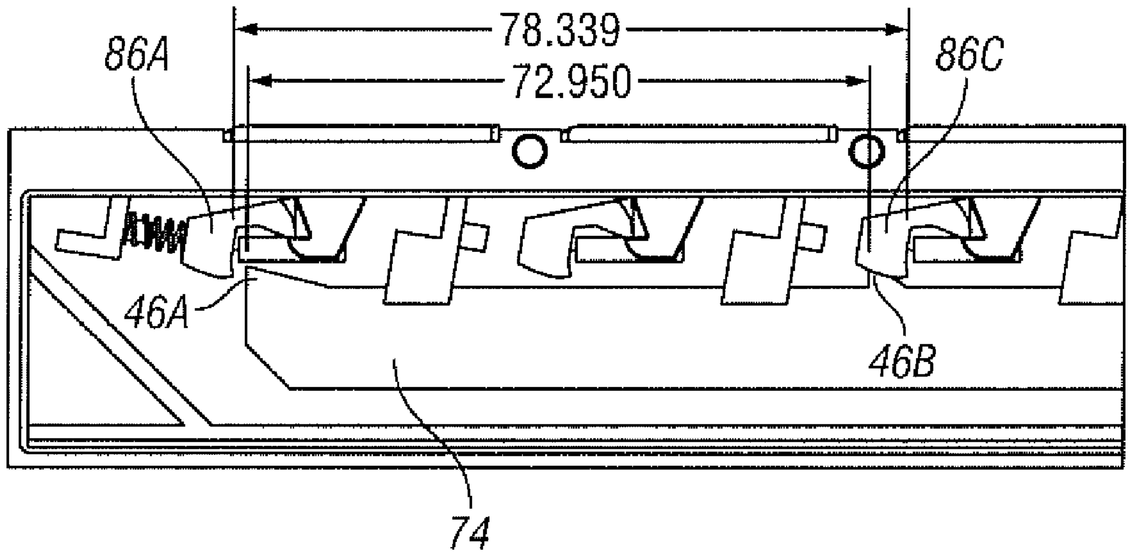
FIG. 14 illustrates an exemplary embodiment of a latch-release system according to certain embodiments of the present disclosure.

FIG. 14 illustrates an exemplary embodiment of a latch-release system according to certain embodiments of the present disclosure. In this embodiment, inner slide 74 has a plurality of latch drivers 46 that can each release two latches when operated according to the procedure illustrated in FIGS. 13A-13E. The separation, or pitch, of adjacent latch drivers 46A and 46B is slight less than the separation of latches 86A and 86C. In this example, latch drivers 46A and 46B are separated by 72.950 millimeters whereas latches 86A and 86C are separated by 78.339 millimeters.

It can be seen that the disclosed embodiments of the multi-lidded dispensing cartridge enable the dispensing of one or more items from a single compartment without allowing access to the contents of other compartments. If a single item is placed in each compartment, this enables single-item dispensing of items such as high-value medications or supplies and controlled substances. The use of a single release mechanism to selectively release all the lids of a cartridge allows a simpler and less expensive system. Cartridges may be provided in a variety of widths, enabling a user to easily configure a drawer to provide a variety of compartment sizes such that large items may be handled in some compartments while the remaining compartment may be efficiently used to dispense smaller items.

The previous description is provided to enable any person skilled in the art to practice the various aspects described herein. While the foregoing has described what are considered to be the best mode and/or other examples, it is understood that various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean “one and only one” unless specifically so stated, but rather “one or more.” Unless specifically stated otherwise, the terms “a set” and “some” refer to one or more. Pronouns in the masculine (e.g., his) include the feminine and neuter gender (e.g., her and its) and vice versa. Headings and subheadings, if any, are used for convenience only and do not limit the invention.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as “top,” “bottom,” “front,” “rear” and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an “aspect” does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an “embodiment” does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

The word “exemplary” is used herein to mean “serving as an example or illustration.” Any aspect or design described herein as “exemplary” is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase “means for” or, in the case of a method claim, the element is recited using the phrase “step for.” Furthermore, to the extent that the term “include,” “have,” or the like is used in the description or the claims, such term is intended to be inclusive in a manner similar to the term “comprise” as “comprise” is interpreted when employed as a transitional word in a claim.

What is claimed is:

1. A cartridge, comprising:

a body having an exterior and a plurality of bins, each bin having an opening;

a plurality of lids movably attached to the body, each lid configured to cover the opening of a bin, each lid having a fastening element;

a release mechanism movably attached to the body, the release mechanism movable along an axis; and a plurality of latches movably attached to the body, each of the plurality of latches configured to engage the respective fastening element of the plurality of lids when in a first position and to release the respective fastening element when in a second position;

wherein the latches and release mechanism are configured such that the release mechanism will not cause a latch to move to the second position when the release mechanism is moving along the axis in a first direction and the release mechanism will cause a single latch to move to the second position while leaving the remaining latches in the first position when the release mechanism is moving along the axis in a second direction that is opposite to the first direction.

2. The cartridge of claim 1 wherein the body is configured such that the bins are in a single row.

3. The cartridge of claim 1, further comprising a plurality of biasing elements coupled to the plurality of latches, each biasing element configured to urge the respective latch to move to the first position.

4. The cartridge of claim 1, further comprising a drive input coupled to the release mechanism such that a first motion of the drive input causes the release mechanism to move in the first direction and a second motion of the drive input causes the release mechanism to move in the second direction, the second motion being opposite to the first motion.

5. The cartridge of claim 4, further comprising a drive motor attached to the body and coupled to the drive input.

6. The cartridge of claim 5, further comprising:
a motor control processor coupled to the drive motor; and
a connector coupled to the motor control processor and attached to the body, the connector having contacts exposed on the exterior of the body;
wherein the motor control processor is configured to receive command signals through the connector.

7. The cartridge of claim 6, wherein the body and the lids are configured such that the lids cannot be opened except by receipt of command signals through the connector.

8. The cartridge of claim 1 wherein the release mechanism comprises:
an endless belt passing over first and second pulleys, the endless belt following a path that begins at a starting point on the first pulley and follows a straight first path from the first pulley to the second pulley, partially around the second pulley, a second path from the second pulley to the first pulley, and partially around the first pulley to the starting point, wherein the first path forms the axis of movement of the release driver; and
a latch driver fixedly attached to the endless belt, wherein the latch driver interacts with the latches as the latch driver moves along the first path, and wherein movement of the release mechanism in the first direction along the axis of motion comprises movement of the latch driver along the first path in the first direction.

9. The cartridge of claim 8 wherein the latch driver may be moved continuously around the path of the endless belt in the first direction.

10. The cartridge of claim 1 wherein the release mechanism comprises:
an outer slide having a shaped hole with a centerline path with a first detent position at a first end of the centerline path and a second detent position at a second end of the centerline path;
an inner slide having an attached post that passes though the shaped hole of the outer slide and is movable between the first and second detent positions, wherein the inner slide moves parallel to the outer slide following a path defined by the post following the centerline path of the shaped hole, the inner slide also having an attached latch driver.

11. The cartridge of claim 10 wherein the second detent is closer to the latches than the first detent, such that the latch driver will disengage the latches when moving in the second direction with the post in the second detent and the latch driver will not disengage the latches when moving in either the first or second direction when the post is in the second detent.

12. The cartridge of claim 11 wherein:
the body comprises a first and a second travel stop;
the post of the inner slide is moved from the first detent to the second detent by moving the outer slide in the first direction until the inner slide contacts the first travel stop whereupon the outer slide moves relative to the inner slide until the post reaches the second detent; and
the post is moved from the second detent to the first detent by moving the outer slide in the second direction until the inner slide contacts the second travel stop whereupon the outer slide moves relative to the inner slide until the post reaches the first detent.

13. The cartridge of claim 1 wherein:
the release mechanism comprises a sliding carrier having a plurality of flexible arms;
the latches have outer surfaces that are closest to the sliding carrier;
the flexible arms have tips that contact the outer surfaces of the latches as the sliding carrier moves along the axis, the tips deflecting outward to follow the shape of the outer surface of the latches;
the outer surfaces of the latches have shaped cavities such that the tips of the flexible arms pass across the shaped cavities when the tips of the flexible arms are initially not in contact with the latches and the sliding carrier moves in the first direction, and the tips of the flexible arms snag the latch when the tips of the flexible arms are initially not in contact with the latches and the sliding carrier moves in the first direction until the tips are in contact with the cavity and then moves in the second direction whereupon the latches move with the sliding carrier as the sliding carrier continues to move in the second direction, the movement of the latches in the second direction disengaging the retention features of the lids; and
the outer surfaces of the latches have diverter paths around the shaped cavities such that the tips of the flexible arms follow the diverter paths when tips of the flexible arms are initially not in contact with the latches and the sliding carrier moves in the second direction.

14. A dispensing system, comprising:
a cartridge comprising:
a body having an exterior and a plurality of bins;
a plurality of lids movably attached to the body, the lids having closed positions wherein the lids cover the respective bins; and
a connector having contacts exposed on the exterior of the body;
wherein the cartridge is configured such that the lids cannot be opened except by receipt of a command signal by the cartridge through the connector; and
a cabinet comprising:
a housing having a docking location configured to accept a cartridge;
a docking connector attached to the housing, wherein the housing is configured such that the docking connector connects to the cartridge connector when the cartridge is placed on the docking location; and
a controller coupled to the docking connector, the controller configured to send the command signals to the cartridge via the docking connector to open one or more of the lids.

15. The dispensing system of claim 14, wherein:
the cartridge body comprises a retention feature and the cabinet housing comprises a latch movably attached to the housing and coupled to the controller;
the latch is configured to engage the retention feature when the cartridge is placed on the docking location; and
the controller is configured to cause the latch to release the retention feature of the cartridge.

16. The dispensing system of claim 14, wherein:
the housing has a plurality of docking locations and a plurality of docking connectors associated with respective docking locations; and
wherein the cartridge may be placed in a plurality of docking locations.

17. The dispensing system of claim 16 wherein:
at least one cartridge has a first width;

at least one cartridge has a second width that is approximately an integer multiple of the first width;

at least one docking location is configured to accept both the first width cartridge and the second width cartridge.

18. The dispensing system of claim 17 wherein:

cartridges are provided in a plurality of widths that are approximately integer multiples of the first width; and at least one docking location is configured to accept any of the plurality of widths of cartridges.

19. The dispensing system of claim 14, further comprising:

a user interface coupled to the controller; and a memory coupled to the controller, the memory containing instructions and data related to the cartridge;

wherein the controller is further configured to receive a request for an item from a user via the user interface, whereupon the controller is configured to retrieve the instructions and data from the memory and send a command signal to the cartridge according to the retrieved instructions and data to open the lid over the bin containing the requested item.

20. The dispensing system of claim 19, wherein the item is a medication.

21. The dispensing system of claim 20, wherein the medication is a controlled substance.

22. The dispensing system of claim 19, further comprising a communication module coupled to the controller and to a remote database containing information about a plurality of cartridges, the information including identification of the contents of at least one bin of the plurality of cartridges, and wherein the cartridge comprises an identifier, and wherein the controller is further configured to retrieve the cartridge identifier from the cartridge when the docking location has accepted the cartridge, transmit the cartridge identifier to the remote database, receive the information about the cartridge from the remote database, and to store the information about the cartridge.

23. The dispensing system of claim 22, wherein the cartridge further comprises a cartridge memory that comprises the cartridge identifier, and wherein the controller is further configured to retrieve the cartridge identifier from the cartridge memory when the cartridge is connected to the docking connector.

24. The dispensing system of claim 22, wherein the controller is further configured to send information related to each item for which the lid over the bin containing the item is opened to the remote database via the communication module.

25. The dispensing system of claim 22, wherein the remote database also contains information about users, and wherein the controller is further configured to request the information about the users from the remote database upon receipt of a request for an item from a user via the user interface, and the controller is further configured to compare the user request to the information received from the remote database and verify that the user is authorized to remove the requested item prior to sending the command signal to the cartridge to open the lid over the bin containing the requested item.

26. The dispensing system of claim 22, wherein the cartridge contains a medication, and the remote database also contains information about orders for administration of medications to patients, and wherein the controller is further configured to request the information about medication administration orders from the remote database upon receipt of a request for a medication from a user via the user interface wherein the request includes an identification of a patient to whom the medication will be administered, and the controller is further configured to compare the user request to the information received from the remote database and verify that the requested medication has been ordered to be administered to the identified patient prior to sending the command signal to the cartridge to open the lid over the bin containing the requested medication.

27. A method of providing access to a single bin of a cartridge having a plurality of bins, comprising the steps of:

moving a latch driver along an axis of motion, the latch driver having an actuation mode and a bypass mode, wherein the latch driver will not actuate a latch while moving in a first direction while in the actuation mode but will actuate the latch to open a lid covering the bin while moving in a second direction while in the actuation mode, the second direction being opposite of the first direction, and wherein the latch driver will not actuate the latch when moving in either the first or second direction while in the bypass mode;

switching the latch driver to bypass mode upon reaching a first end of a range of motion while moving in the first direction along the axis of motion;

moving the latch driver in the second direction over the entire range of motion;

switching the latch driver to actuation mode upon reaching a second end of the range of motion while moving in the second direction along the axis of motion;

moving the latch driver in the first direction until the latch driver passes the latch; and moving the latch driver in the second direction until the latch driver displaces the latch sufficient to disengage the latch from the lid, allowing the lid to open and allowing access to the bin.

28. The method of claim 27, wherein:

the latch driver comprises an endless belt passing over two pulleys and thus forming an upper path and a lower path between the pulleys, wherein the endless belt is moved by rotation of the pulleys, and wherein the latch driver is fixedly attached to the endless belt and can follow the endless belt around the full circumference of the upper and lower paths of the endless belt;

the steps of moving the latch driver in the first direction comprise rotating the pulleys in a forward direction such that the endless belt moves in the first direction along the upper path;

the step of switching the latch driver to bypass mode comprises rotating the pulleys in the forward direction such that the latch driver passes over a pulley and is positioned on the lower path;

the step of moving the latch driver in the second direction over the entire range of motion comprises rotating the pulleys in the forward direction such that the endless belt moves in the second direction along the lower path;

the step of switching the latch driver to actuation mode comprises rotating the pulleys in the forward direction such that the latch driver passes over a pulley and is positioned on the upper path; and the step of moving the latch driver in the second direction until the drive feature of the latch driver displaces the latch comprises rotating the pulleys in a reverse direction, the reverse direction being opposite to the forward direction, such that the endless belt moves in the second direction along the upper path.

29. The method of claim 27, wherein:

the latch driver comprises an inner slide and an outer slide, wherein the inner slide comprises a post that fits into a shaped hole in the outer slide, the shaped hole having a first detent and a second detent;

the step of switching the latch driver to bypass mode is accomplished by moving the post to the first detent;

the step of switching the latch driver to actuation mode is accomplished by moving the post to the second detent.

30. The method of claim 27, wherein:

the latch driver comprises a sliding carrier having a plurality of flexible arms, each arm having a tip that slides across an outer surface of the latch;

the step of switching the latch driver to bypass mode is accomplished by moving the post to the first detent;

the step of switching the latch driver to actuation mode is accomplished by moving sliding carrier in the second direction until the tip of a flexible arm is positioned in a shaped cavity on the outer surface of the latch and then moving the sliding carrier in the first direction, whereupon the tip catches an edge of the shaped cavity and pulls the latch in the second direction thereby disengaging the latch from the lid.

* * * * *

UNITED STATES PATENT AND TRADEMARK OFFICE

CERTIFICATE OF CORRECTION

PATENT NO. : 8,335,588 B2
APPLICATION NO. : 12/828124
DATED : December 18, 2012
INVENTOR(S) : Michael Rahilly et al.

It is certified that error appears in the above-identified patent and that said Letters Patent is hereby corrected as shown below:

Columns 12, 13 and 14 in the claims:

Please delete claims 14-26.

Signed and Sealed this
Third Day of September, 2013

Teresa Stanek Rea
*Acting Director of the United States Patent and Trademark Office*

UNITED STATES PATENT AND TRADEMARK OFFICE

CERTIFICATE OF CORRECTION

| | |
|---|---|
| PATENT NO. | : 8,335,588 B2 |
| APPLICATION NO. | : 12/828124 |
| DATED | : December 18, 2012 |
| INVENTOR(S) | : Michael Rahilly et al. |

It is certified that error appears in the above-identified patent and that said Letters Patent is hereby corrected as shown below:

Delete the title page and substitute therefore with the attached title page showing the corrected number of claims in patent.

In the Claims:

Column 12, line 30 - Column 14, line 5, delete claims 14-26.

This certificate supersedes the Certificate of Correction issued September 3, 2013.

Signed and Sealed this
Eighth Day of October, 2013

Teresa Stanek Rea
*Deputy Director of the United States Patent and Trademark Office*

(12) United States Patent
Rahilly et al.

(10) Patent No.: US 8,335,588 B2
(45) Date of Patent: Dec. 18, 2012

(54) MULTI-LIDDED DISPENSING CARTRIDGE SYSTEM

(75) Inventors: Michael Rahilly, Encinitas, CA (US); Frank Dean Weber, San Diego, CA (US)

(73) Assignee: CareFusion 303, Inc., San Diego, CA (US)

( * ) Notice: Subject to any disclaimer, the term of this patent is extended or adjusted under 35 U.S.C. 154(b) by 314 days.

(21) Appl. No.: 12/828,124

(22) Filed: Jun. 30, 2010

(65) Prior Publication Data

US 2012/0004772 A1 Jan. 5, 2012

(51) Int. Cl.
*G06F 17/00* (2006.01)

(52) U.S. Cl. ......... 700/242; 700/241; 221/156; 312/222

(58) Field of Classification Search .................. 700/242, 700/241; 221/156; 312/222, 209
See application file for complete search history.

(56) References Cited

U.S. PATENT DOCUMENTS

| | | | | |
|---|---|---|---|---|
| 4,033,477 A | | 7/1977 | Hoppe et al. | |
| 4,668,150 A | | 5/1987 | Blumberg | |
| 5,588,317 A | | 12/1996 | Bianco | |
| 5,927,540 A | * | 7/1999 | Godlewski | 312/209 |
| 5,940,306 A | | 8/1999 | Gardner et al. | |
| 6,011,999 A | * | 1/2000 | Holmes | 700/242 |
| 6,631,805 B2 | | 10/2003 | Bramen | |
| 6,666,055 B2 | | 12/2003 | Janicek | |
| 7,142,944 B2 | * | 11/2006 | Holmes et al. | 700/242 |
| 7,426,425 B2 | * | 9/2008 | Meek et al. | 700/241 |
| 7,630,791 B2 | * | 12/2009 | Nguyen et al. | 700/242 |
| 8,103,379 B2 | * | 1/2012 | Biba et al. | 700/242 |
| 8,197,017 B2 | * | 6/2012 | Rahilly | 312/222 |
| 8,234,008 B2 | * | 7/2012 | Weber | 700/242 |
| 2009/0114562 A1 | | 5/2009 | Noble et al. | |

FOREIGN PATENT DOCUMENTS

| | | |
|---|---|---|
| EP | 0771739 | 5/1997 |
| JP | 10-201825 | 8/1998 |
| WO | WO 2009-022101 | 2/2009 |

* cited by examiner

*Primary Examiner* — Timothy Waggoner
(74) *Attorney, Agent, or Firm* — McDermott Will & Emery LLP

(57) ABSTRACT

A cartridge for use in a dispensing system is disclosed. The cartridge includes a body having an exterior and a plurality of bins. A plurality of lids are movably attached to the body and are configured to cover a bin. A release mechanism is movable along an axis. A plurality of latches are movably attached to the body. Each latch is configured to secure the respective lid when in a first position and to release the respective lid when in a second position. The release mechanism will not cause a latch to move to the second position when the release mechanism is moving along the axis in a first direction. The release mechanism will cause a single latch to move to the second position while leaving the remaining latches in the first position when the release mechanism is moving along the axis in a second direction.

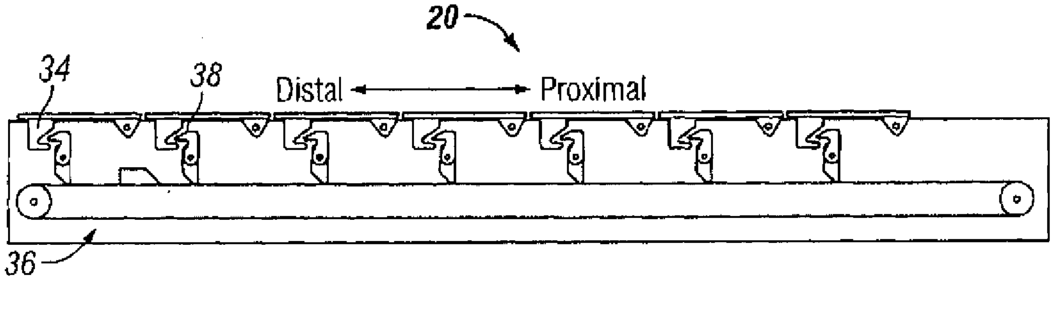

17 Claims, 17 Drawing Sheets